No. 703,613. Patented July 1, 1902.
T. C. ROBINSON.
BICYCLE DRIVING MECHANISM.
(Application filed Dec. 26, 1899.)
(No Model.)
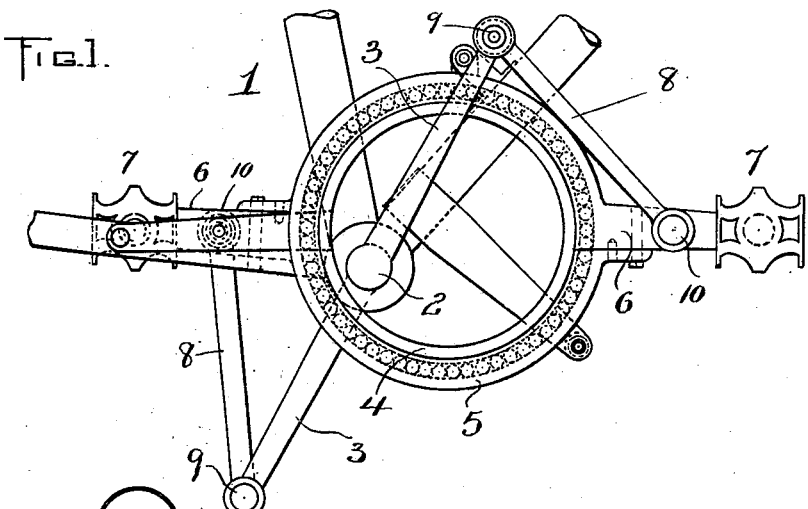
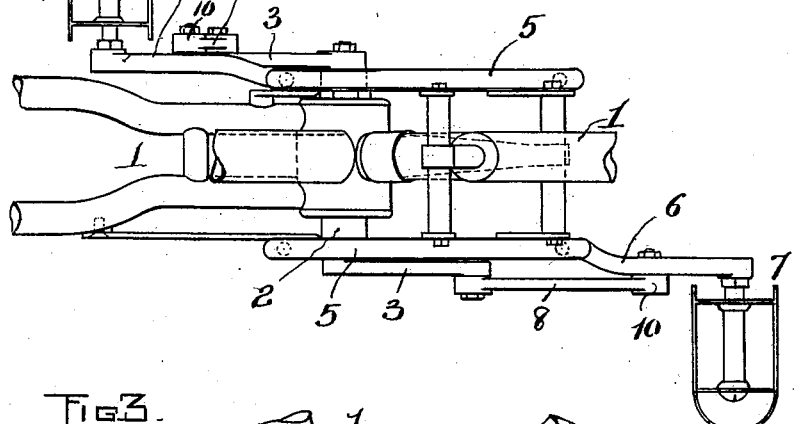
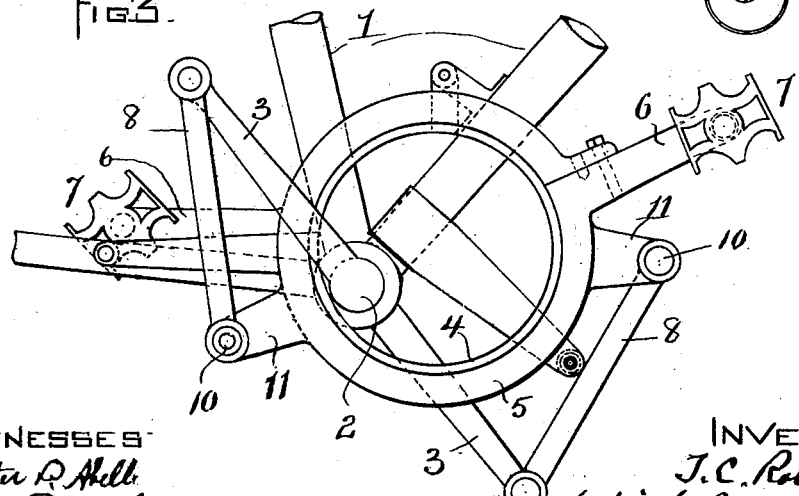
WITNESSES
INVENTOR:
T. C. Robinson

UNITED STATES PATENT OFFICE.

THOMAS C. ROBINSON, OF BOSTON, MASSACHUSETTS, ASSIGNOR OF ONE-HALF TO E. BAKER WELCH AND H. AUGUSTA WELCH, OF CAMBRIDGE, MASSACHUSETTS.

BICYCLE DRIVING MECHANISM.

SPECIFICATION forming part of Letters Patent No. 703,613, dated July 1, 1902.

Application filed December 26, 1899. Serial No. 741,587. (No model.)

*To all whom it may concern:*

Be it known that I, THOMAS C. ROBINSON, of Boston, in the county of Suffolk and State of Massachusetts, have invented certain new and useful Improvements in Bicycle Driving Mechanism, of which the following is a specification.

This invention relates to bicycle driving mechanisms of that class in which the pedal is guided eccentrically to the driving-shaft for the purpose of obtaining an increased leverage on the downstroke of the foot. It is common in such mechanisms to employ a pedal-lever or equivalent carrying the pedal and guided eccentrically to the driving-shaft and a compensating connection between the pedal-lever and the crank. Heretofore this connection has been a sliding one, and the objections to it are a degree of complexity, considerable working friction, and exposure to dust.

The object of my invention is to overcome these objections by providing a pivotal link connection between the pedal or pedal-lever and the crank.

The invention consists in the novel features of construction and arrangement which I shall now proceed to describe and claim.

Of the accompanying drawings, Figure 1 represents a side elevation of a bicycle driving mechanism constructed in accordance with my invention. Fig. 2 represents a plan view thereof with the bicycle-frame in section. Fig. 3 represents a view similar to Fig. 1, showing a modification.

Referring to the drawings, 1 designates the frame of a bicycle or similar vehicle, and 2 designates the driving-shaft or crank-shaft journaled in bearings on said frame. To said driving-shaft is affixed a crank 3.

4 is an eccentric having its inner part affixed by suitable means to the frame 1 and having a strap 5, adapted to revolve upon said inner part, suitable antifriction-bearings being interposed between the strap and the fixed part.

6 is an arm or extension on the eccentric-strap 5, carrying the pedal 7 at its outer end. The center of the eccentric 4 is placed a certain distance in advance of the center of the driving-shaft 2, so that the pedal 7 travels in a circle eccentric to the driving-shaft, the greatest distance of the pedal from the shaft being reached when the pedal is at a point in its downward stroke.

8 is a link pivotally connected at the point 9 with the crank 3 and at the point 10 with the pedal arm or lever 6. This link completes a positive connection between the pedal 7 and the driving-shaft 2.

The described driving mechanism is repeated on the opposite side of the bicycle. It is apparent that the rider's foot pressing on the pedal 7 will exert a maximum leverage on the driving-shaft 2 when the said pedal is at its greatest distance from said driving-shaft and a minimum leverage when it is at its least distance from said shaft. During different portions of the revolution of the pedal and crank-shaft the angle between the crank-shaft 3 and the link 8 will vary, being greatest when the pedal is farthest from the driving-shaft and least when the pedal is nearest to said shaft, as seen in Fig. 1.

In the modification illustrated in Fig. 3 the link 8 instead of being pivoted to the pedal-arm 6 is pivoted to a lug 11 on the eccentric-strap, located at a point diametrically opposite the pedal-arm. In this case the angle between the link and crank is greatest on the upstroke of the pedal and least on the downstroke.

It will be noted that there are in this mechanism no sliding joints in the connection between the pedal and the driving-shaft. The joints 9 and 10 are pivotal joints capable of being constructed in a dust-proof manner and of operating with a very small amount of friction. The mechanism is exceedingly simple and strong.

The mechanism shown in Fig. 3 has an advantage over that shown in Fig. 1, due to the fact that the compensating connection between the pedal and the crank is made at a point on the opposite side of the center of the pedal-shaft from the pedal. The velocity of the pedal is then greatest on the downstroke and least on the upstroke, which is obviously an advantage, whereas in the arrangement shown in Fig. 1 the reverse is true. The principal advantage is that with this form the pedal makes the upstroke with a diminishing velocity instead of an accelerating velocity, which latter tends to throw the rider over the handle-bars.

I claim—

1. In a bicycle driving mechanism, the combination of a driving-shaft, a crank attached thereto, a pedal, and means for guiding said pedal in a path eccentric to the driving-shaft, and a compensating connection between the pedal and the crank, said connection being located on the opposite side of the center of the pedal-path from the said pedal and adapted to diminish the upstroke velocity of the pedal relatively to its downstroke velocity.

2. In a bicycle driving mechanism, the combination of a frame, a driving-shaft journaled thereon, a crank attached to said shaft, an eccentric affixed to said frame and having a strap, a pedal attached to said strap, and a link pivotally attached to the crank, and to the eccentric-strap at a point on the opposite side of the center of the eccentric from said pedal, whereby the upstroke velocity of the pedal is diminished.

In testimony whereof I have affixed my signature in presence of two witnesses.

THOMAS C. ROBINSON.

Witnesses:
C. F. BROWN,
P. W. PEZZETTI.